Jan. 4, 1949.   H. V. ROBINSON   2,457,922
NET
Filed Aug. 7, 1946
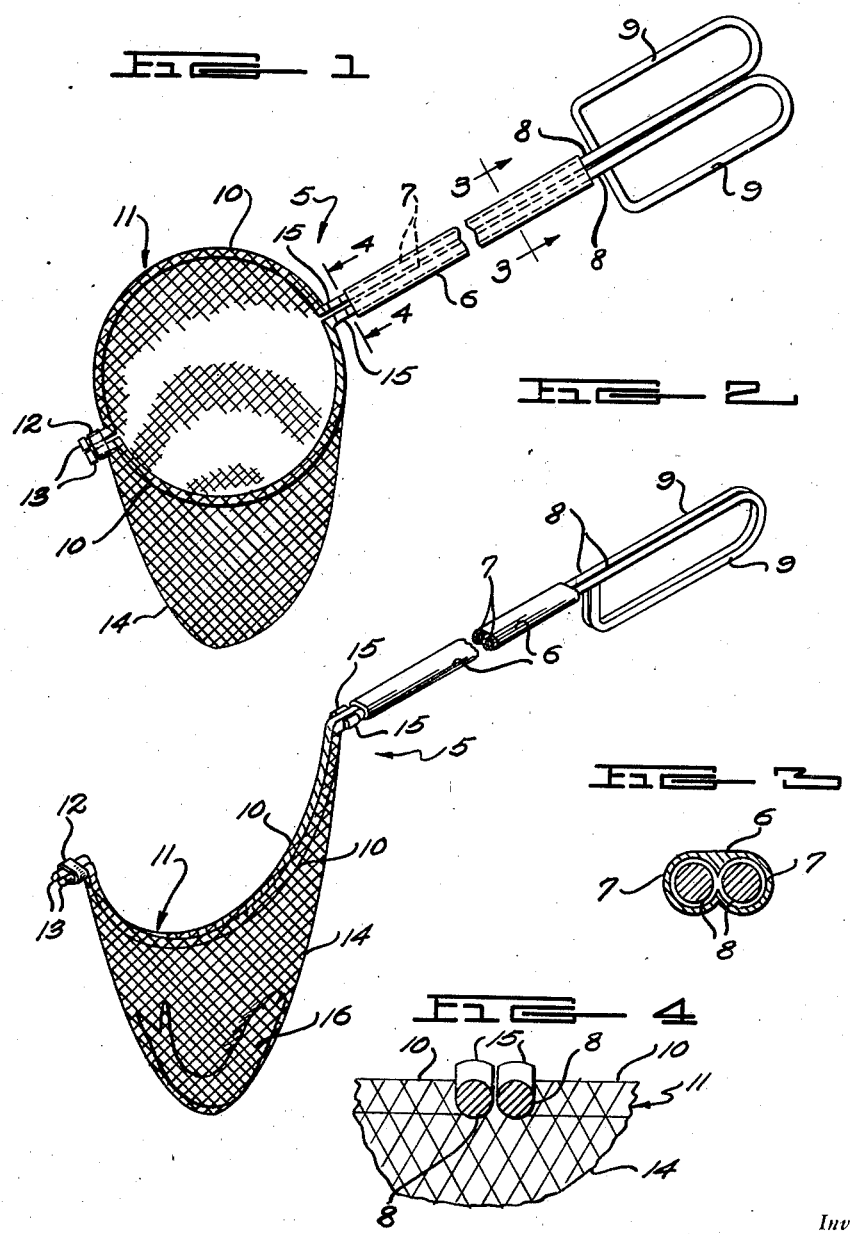
Inventor
HERMAN V. ROBINSON Patented Jan. 4, 1949

2,457,922

UNITED STATES PATENT OFFICE 2,457,922

NET

Herman V. Robinson, Thorsby, Ala.

Application August 7, 1946, Serial No. 688,941

2 Claims. (Cl. 43—12)

This invention relates to new and useful improvements and structural refinements in nets, more specifically, in fishing nets, and the principal object of the invention is to provide the device of the character herein described which is particularly adapted to prevent the escape of fish, or the like, therefrom.

A further object of the invention is to provide a net which is simple in construction and which may be easily and conveniently manipulated.

Another object of the invention is to provide a net which is pleasing in appearance and light in weight.

An additional object of the invention is to provide a net which will readily lend itself to economical manufacture.

With the above more important objects in view, and such other objects as may become apparent as this specification proceeds, the invention consists essentially of the arrangement and construction of parts as illustrated in the accompanying drawings, in which:

Figure 1 is a perspective view of the invention, showing the same in an open position;

Figure 2 is a further perspective view similar to that shown in Figure 1, but illustrating the invention in the collapsed or closed position;

Figure 3 is a cross sectional view, taken substantially in the plane of the line 3—3 in Figure 1, and Figure 4 is a cross sectional view, taken substantially in the plane of the line 4—4 in Figure 1.

Like characters of reference are used to designate like parts in the specification and throughout the several views.

Referring now to the accompanying drawings in detail, the invention consists of a net, more particularly, a net assembly designated generally by the reference character 5, the same embodying in its construction a tube-like socket 6 forming a pair of spaced, parallel channels 7, the cross sectional configuration of this socket being best illustrated in the accompanying Figure 3.

A pair of wire-like rods 8 are rotatably positioned in the channels 7 and project at both ends therefrom, the projecting end portions of said rods forming a pair of handles 9 at one end of the socket 6, as will be clearly apparent from the accompanying drawing.

The remaining end portions of the rods 8 are arcuated and constitute semi-circular, complementary sections 10 of a collapsible frame designated generally by the reference character 11. A tie clip 12, similar in cross section to the aforementioned socket 6 is positioned at the free extremities of the sections 10 and forms what may be referred to as a bearing therefor, suitable collars 13 being employed to retain the clip 12 in position.

A sack of netting material 14 is secured to the frame 11 as will be clearly understood and each of the rods 8 are provided adjacent the socket 6 with a stop dog 15, best illustrated in Figure 4.

When the invention is placed in use, manipulation of the handles 9 will rotate the rods 8 in the socket 6 so as to arrange the frame 11 into a substantially coplanar circular formation and to open the sack 14 as is clearly shown in Figure 1.

When the fish 16, or the like, is placed or caught in the sack 14, the handles 9 are again manipulated so as to collapse the frame 11 as shown in Figure 2, thereby preventing the escape of the fish.

It will be noted that when the device is in its open position as shown in Figures 1 and 4, the dogs 15 will contact one another and thus function as effective stops for preventing rotation of the rods 8 beyond, that is upwardly beyond, the position shown in Figure 1.

It is believed that the advantages and use of the invention will be clearly understood from the foregoing disclosure, and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. A fish net comprising in combination, a tube-like socket, a pair of parallel rods rotatably positioned in said socket and protruding at both ends therefrom, a pair of handles provided on the protruding ends of said rods at one end of said socket, the remaining end portions of said rods being arcuated and constituting complemental sections of a collapsible frame, a sack of netting secured to said frame, and means for restricting the rotation of said rods.

2. A fish net comprising in combination, a tube-like socket forming a pair of spaced parallel channels, a wire-like rod rotatably positioned in each of said channels and projecting at both ends therefrom, the projecting end portions of said rod forming a pair of handles at one end of said socket, the remaining end portions of said rods being arcuated and constituting essentially semi-circular, complemental sections of a collapsible frame, a sack of netting secured to said frame, a tie clip positioned at the free extremities of said sections and forming a bearing therefor, and a stop dog secured to each of said rods adjacent said socket, said dogs being engageable with one another and restricting the rotation of said rods.

HERMAN V. ROBINSON.

REFERENCES CITED

The following references are of record in the file of this patent:

UNITED STATES PATENTS

| Number | Name | Date |
|---|---|---|
| 557,590 | Martin | Apr. 7, 1896 |
| 959,555 | Koberstein | May 31, 1910 |
| 1,012,045 | Adams | Dec. 19, 1911 |